United States Patent
Majnaric et al.

[11] Patent Number: 5,927,346
[45] Date of Patent: Jul. 27, 1999

[54] CONCRETE PIPES AND METHODS FOR THE MANUFACTURE THEREOF

[75] Inventors: Anton B. Majnaric, Copley; William M. Bjerke, Hudson, both of Ohio

[73] Assignee: Majnaric Technologies, Inc., Copley, Ohio

[21] Appl. No.: 08/786,780

[22] Filed: Jan. 21, 1997

[51] Int. Cl.$^6$ .................................................... F16L 9/22
[52] U.S. Cl. ........................ 138/175; 138/117; 138/174
[58] Field of Search ................................. 138/114, 116, 138/117, 174, 175

[56] References Cited

U.S. PATENT DOCUMENTS

| | | | |
|---|---|---|---|
| 1,880,599 | 10/1932 | Ukropina | 138/175 |
| 2,959,197 | 11/1960 | Eggink et al. | 138/175 |
| 3,889,715 | 6/1975 | Lilja et al. | 138/117 |
| 3,933,182 | 1/1976 | Costes | 138/175 |
| 3,957,087 | 5/1976 | Johnston | 138/175 |
| 3,990,480 | 11/1976 | Borodin et al. | 138/178 |
| 4,014,369 | 3/1977 | Kobres, Jr. | 138/175 |
| 4,335,169 | 6/1982 | Saggese | 138/175 |
| 4,467,995 | 8/1984 | Tolliver | 138/175 |

*Primary Examiner*—Denise L. Ferensic
*Assistant Examiner*—James F. Hook
*Attorney, Agent, or Firm*—Renner, Kenner, Greive, Bobak, Taylor & Weber

[57] ABSTRACT

A concrete pipe and methods for forming the same are presented by this invention. The pipe includes an inner and outer sleeve separated by a spacer ring which creates a void therebetween. Concrete is poured within this void to solidify the pipe structure. The spacer ring is formed by a plurality of interlocking ring forms which have nesting members to allow for the interconnection thereof. In an alternative embodiment, interlocking forms are employed to form both the inner and outer surface of the pipe. These alternative forms provide convex nesting numbers which form internal conduits between the inner and outer surfaces that accept reinforcing members or connection members to interlock the forms to one another. Concrete is then filled in these conduits and between the void of the inner and outer surfaces to solidify the pipe construction. Both embodiments may employ a plurality of elbow forms to form a bell-mouth which connects with the end of an adjacent pipe. Both of these constructions provide the advantage of longer length pipes thereby reducing the overall cost of installing a pipe network system. Additionally, a better seal is obtained by this construction which reduces the amount of silt and debris that can accumulate within the pipe, thereby enhancing the flow characteristics of the pipe.

16 Claims, 6 Drawing Sheets

CONCRETE PIPES AND METHODS FOR THE MANUFACTURE THEREOF

TECHNICAL FIELD

The invention herein resides in the art of concrete pipes and methods for making the same. More particularly, the present invention relates to a concrete pipe which employs structural forms to fabricate the pipe from concrete in situ. Specifically, the present invention relates to a concrete pipe that is constructed on site with same size interlocking forms that receive concrete therein to form the pipe, wherein the length of pipe is provided in lengths much longer than normally available.

BACKGROUND ART

Storm and sanitary sewer systems currently employ a network of pipes to transfer drainage water and the like from point sources to sewage treatment facilities. Most all pipe networks employ concrete piping that is formed or cast and then cured at a manufacturing facility. These pipe sections must be kept short to minimize their weight. Longer length pipes produced off-site are very difficult to handle and are prone to breakage during shipment. As such, lengths of pipe are limited to about 8' lengths and 8' diameters.

When installing these short length pipes, a trench must be dug and provided with a sand/rock bed to support the weight of the pipe and in particular the area in which two pipes are joined together with a joint sealing compound. Unfortunately, due to the number of joints and ground shifting throughout the seasons, these joints leak allowing sediment, silt and other debris to enter the pipe. Flow and capacity reductions occur as a result of the debris impeding flow characteristics. The debris also reduces the effective cross-sectional area of the pipe. As such, pipes with diameters larger than necessary are installed to accommodate the anticipated debris leakage. Another disadvantage of current piping systems is in the overall cost of transporting short, heavy sections of pipe to the location, preparing a proper bed for all the joint locations and joining the short lengths to one another.

Based upon the foregoing there is a need in the art for a concrete pipe that can be provided in long lengths and that reduces the overall cost of installing a pipe network. Furthermore, there is a need for such a pipe that decreases the occurrences of leaks and that increases the water flow therethrough.

DISCLOSURE OF INVENTION

In light of the foregoing, it is a first aspect of the present invention to provide a concrete pipe and method for manufacturing the same.

Still another aspect of the present invention is to provide an inner and outer sleeve that is assembled on site, wherein concrete is poured between the sleeves to form the pipe.

Another aspect of the present invention, as set forth above, is to provide a spacer ring between the sleeves, wherein rebar or other reinforcing rods or cables are placed between the sleeves and through the spacer ring to provide structural strength for the concrete pipe.

Yet another aspect of the present invention, as set forth above, is to provide the spacer rings with interlocking forms that support the inner and outer sleeves and receive concrete therein.

An additional aspect of the present invention is to provide a concrete pipe wherein a form is provided with the desired length of pipe and wherein the form provides an inner and outer surface.

Yet another aspect of the present invention, as set forth above, is provided wherein the inner and outer surface of the pipe is formed by an inner and outer wall of the form, wherein the form has convex members extending between the inner and outer walls with openings therebetween and wherein the convex members nest with the openings between the convex members of an adjacent form.

Still another aspect of the present invention, as set forth above, is wherein the assembled forms and their respective convex members form a conduit along the length of the pipe for receiving concrete or other material for interconnecting the forms.

Yet a further aspect of the present invention, as set forth above, is to insert in the conduit pilot spacers with rebar therethrough or wherein the conduits receive connecting rods that hold the forms in place while concrete is poured between the inner and outer walls.

Still yet another aspect of the present invention, as set forth in both embodiments above, is to provide plurality of elbow forms which may be inserted at one end of a pipe to receive the opposite end of an adjacent pipe.

Still a further aspect of the present invention is to provide a concrete pipe and method for assembling the same which reduces the overall cost of installing a network of pipes and wherein the assembled pipe improves the fluid flow over currently known concrete pipes.

The foregoing and other aspects of the invention which shall become apparent as the detailed description proceeds are achieved by a pipe, comprising: opposed inner and outer surfaces; interconnecting members disposed between the inner and outer surfaces, the interconnecting members and the opposed surfaces forming cavities therebetween; and the cavities receiving concrete therein to form a concrete pipe.

Other aspects of the invention are attained by a method for forming pipe comprising the steps of: providing at least two spacer rings; coupling an inner sleeve with the spacer rings; positioning an outer sleeve around the spacer rings, the inner sleeve and outer sleeve having a void therebetween; and filling concrete in void.

Still other aspects of the present invention are attained by a method for forming a pipe, comprising the steps of: providing a plurality of interlocking forms, the forms having an inner wall, an outer wall and a nesting member interconnecting the inner wall to the outer wall; interconnecting the plurality of interlocking forms to one another by mating the nesting members with one another to form a pipe, the inner wall and the outer wall having a void therebetween; and filling concrete in the void to form a concrete pipe.

BRIEF DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1:
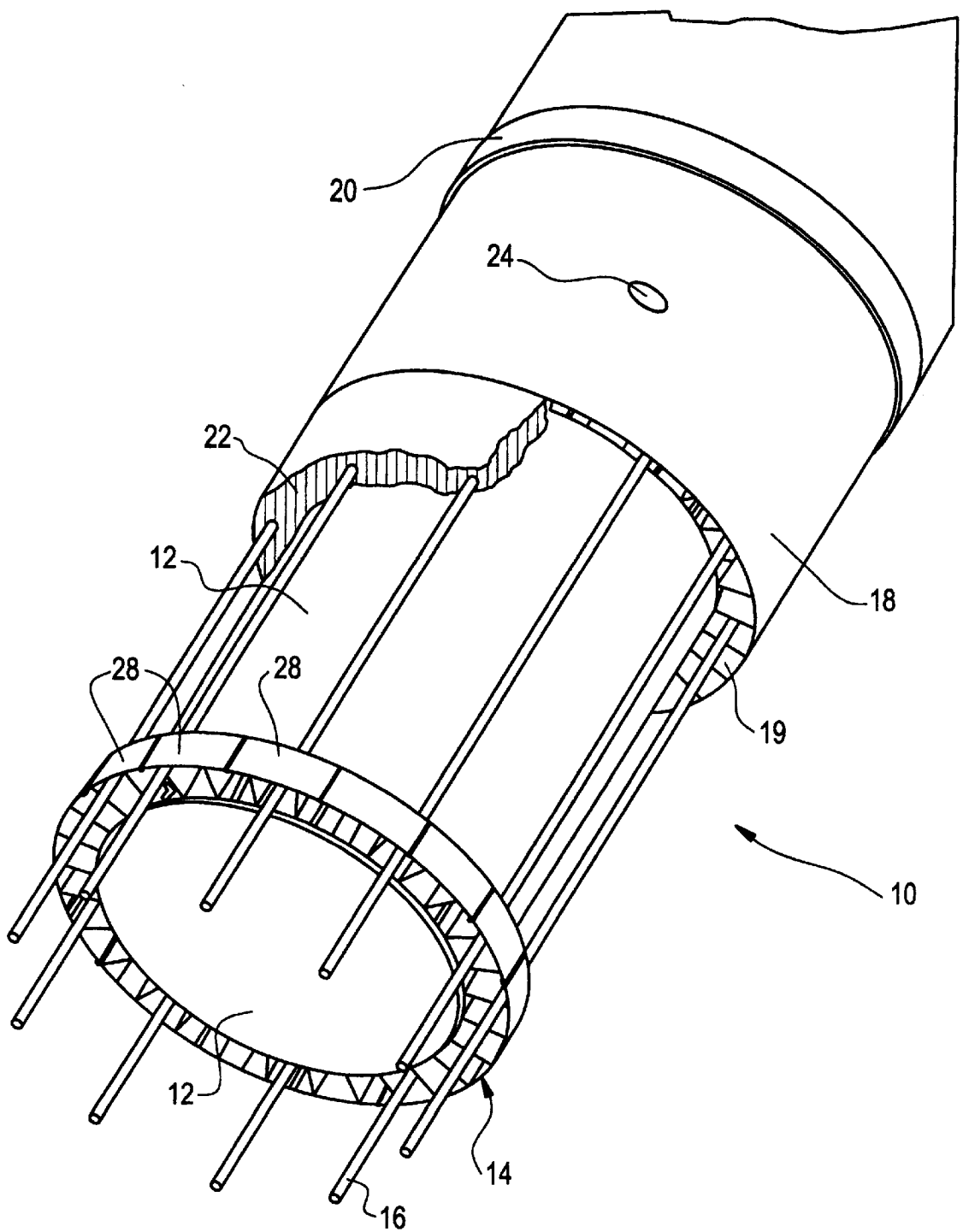
FIG. 1 is a partial-sectional perspective view of a concrete pipe according to the present invention.

Referring now to the drawings and more particularly to FIG. 1, it can be seen that a pipe according to the present invention is designated generally by the numeral 10. The pipe 10 includes an inner sleeve or skin 12 that is received within at least one spacer ring 14. A plurality of reinforcing rods, cable, wire or rebar 16 are axially disposed around the inner sleeve 12. An outer sleeve or skin 18 is disposed around the spacer rings 14 and the inner sleeve 12 to form a void 19. A retaining band 20 may be employed around the outer sleeves 18 to connect ends thereof to one another. Concrete 22 is then inserted into the void 19 to fill in and interconnect the inner sleeve 12 to the outer sleeve 18. Of course, any type of fill material may be used in place of the concrete, as long as the fill material meets the structural requirements needed for transferring fluid. Those skilled in the art will appreciate that the inner sleeve 12 and the outer sleeve 18 is typically a polymeric sheet of material that is formable so that its opposed edges at least touch or overlap one another in order to be welded, fused, bonded with adhesive or the like. Of course, the inner sleeve 12 and the outer sleeve 18 may be provided as an extruded cylinder. It will further be appreciated that the inner sleeve 12 is structurally strong enough to bear the weight of wet concrete as it is poured into the void 19. To facilitate the flow of concrete through the void 19 and through the spacer rings 14, a plurality of holes 24 may be provided in the outer sleeve 18. Different size holes 24 may be employed. Smaller size holes, about ⅛" diameter, would be used for venting air and demonstrating completeness of fill. Larger size holes, about 2" in diameter, would be used for depositing concrete into the void 19. After the concrete 22 sets, it will be appreciated that a structurally rigid pipe 10 is formed that can be used to transfer water, sewage or any other large quantity of liquid material from one point to another. It is anticipated that the pipe 10 will be of a relatively smaller diameter of between 16 to 36 inches.

Figure 2:
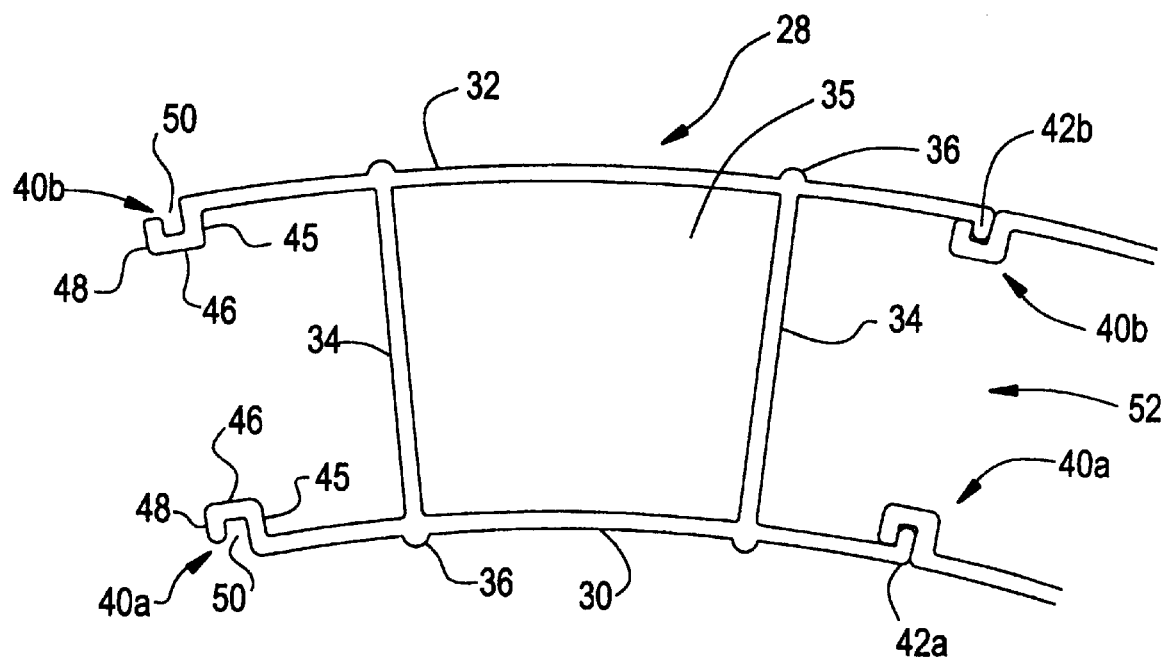
FIG. 2 is an elevational end view of an interlocking ring form used in the assembly of a spacer ring.

Referring now to FIG. 2, it can be seen that an interlocking form 28 is employed in the construction of the spacer ring 14. The interlocking ring form 28 provides an arcuately shaped inner wall 30 and an arcuately shaped outer wall 32. A pair of ribs 34 interconnect the inner wall 30 to the outer wall 32 and form a cavity 35. As those skilled in the art will appreciate, the arcs of the inner wall 30 and the outer wall 32 are sized depending upon the total diameter of the pipe desired. Protruding nubs 36 extend from both the inner wall 30 and the outer wall 32 at a position opposite the interconnecting ribs 34. The protruding nubs 36 serve to position the inner sleeve 12 and the outer sleeve 18 away from the form 28 and also to provide structural strength to the form. Extending from one end of both the inner wall 30 and the outer wall 32 is a hook nesting member 40a and 40b, respectively. The other end of the inner wall 30 and the outer wall 32 has extending therefrom a finger nesting member 42a and 42b, respectively. The hook nesting member 40 includes a flange 45 which extends from the respective wall 30 and 32 inwardly toward the opposite wall. Extending from the flange 45 is a base 46 that is substantially parallel with the respective inner wall 30 and outer wall 32. A lip 48 extends substantially perpendicularly from the base 46 and is substantially parallel with the flange 45. The flange 45, the base 46 and the lip 48 form a groove 50 for receiving the finger nesting member 40 from an adjacent form 28. When two interlocking forms 28 are mated with one another, a connection cavity 52 is formed that alternates with the cavity 35 around the diameter of the spacer ring 14. Those skilled in the art will appreciate that the interlocking ring form 28 is made from a polymeric material which is somewhat flexible, but rigid enough to withstand the weight of concrete that is filled in the void 19 and also the weight of material that is placed over the pipe 10 when the trench holding the pipe is filled in. The interlocking ring forms may be assembled to one another by either sliding the finger nesting members 42a and 42b into the appropriate grooves 50 or by inwardly flexing the hook nesting members 40a and 40b while simultaneously pushing the finger nesting members 42a and 42b outwardly so that the nesting members mate with one another.

Those skilled in the art will readily understand from the foregoing structure how the pipe 10 is assembled. Both sleeves 12 and 18 may be formed off-site and then assembled with the spacer rings 14 off-site or near the trench. Alternatively, the pipe may be assembled by workers in proximity to the trench by the process described below. In either case, the assembled sleeves 12 and 18 and the spacer rings 14 are situated in the trench by the workers.

When the sleeves are assembled off-site, workers will assemble the interlocking ring forms 28 to form a spacer ring 14. It is envisioned that by using the pipe construction methods disclosed herein, that rock/sand beds will only be required at pipe joints. The spacer rings 14 are then placed in the trench at predetermined intervals. The inner sleeve 12 is then inserted into the interior of the spacer ring 14. Alternatively, the spacer rings 14 may be formed around the inner sleeve 12. It is envisioned that a horizontal cantilevered beam or "finger" will be positioned at about waist height onto which workers can slip the inner sleeve 12, the spacer rings 14, the rebar 16, if desired, and the outer sleeve 18. The rebar 16 may be inserted through either the cavities 35 or the connection cavities 52 and axially positioned between the sleeves 12 and 18. The off-site assembled pipes may then be shipped to the trench and connected end-to-end. If desired, the pipe 10 may be assembled in proximity to the trench. The ends of the pipe 10 may be held together by the retaining band 20 or other means, if needed. At this time, concrete 22 is directed into the void 19 at either the end of the pipe 10 or through the strategically placed larger diameter holes 24. Partial back-filling can begin as soon as the weight of the concrete is sufficient to stabilize the assembled sleeves and spacer rings. Back-filling may be completed when the concrete is set.

Figure 3:
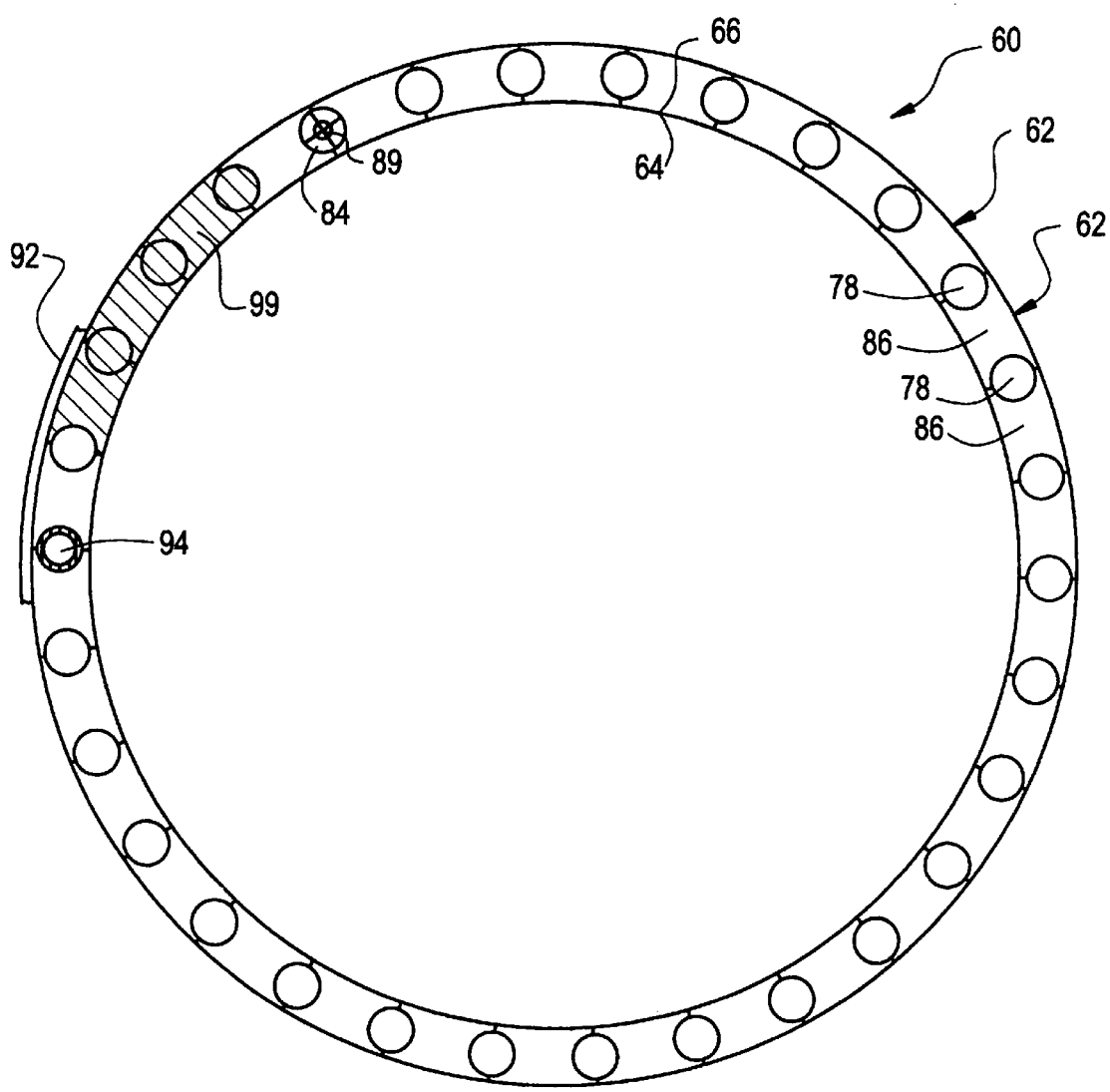
FIG. 3 is a cross-sectional end view of an alternative embodiment of a concrete pipe.
Figure 4:
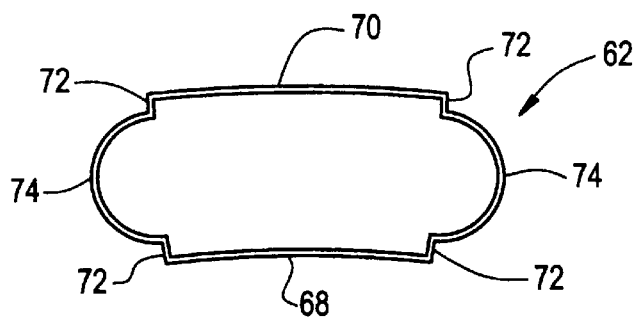
FIG. 4 is an elevational end view of an interlocking form used in the alternative embodiment.
Figure 5:
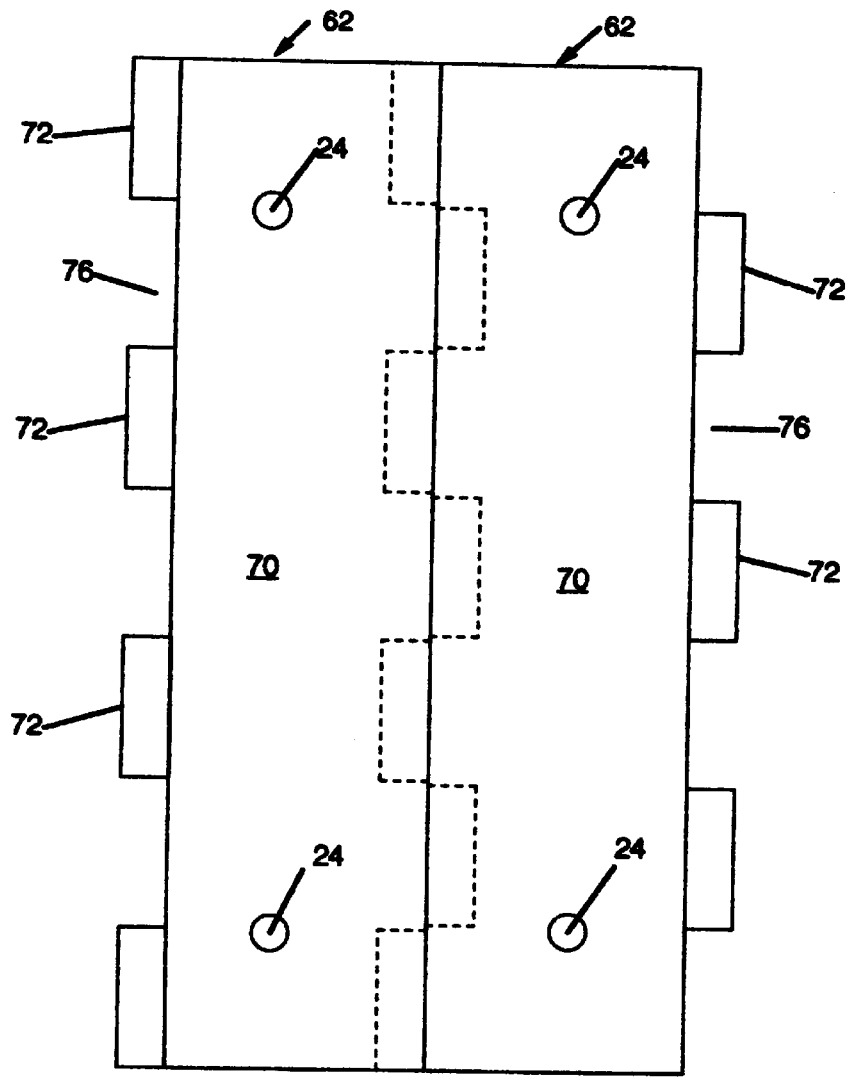
FIG. 5 is a top view showing two interlocking forms adjacent one another.
Figure 6:
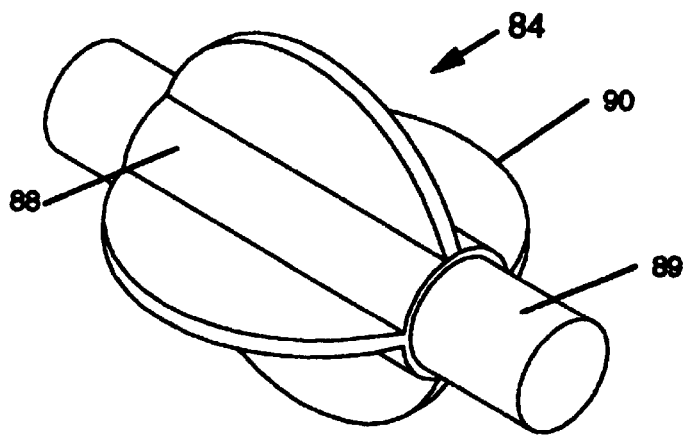
FIG. 6 is a perspective view of a pilot spacer received within the interlocking form of the alternative embodiment.

Referring now to FIGS. 3–5 it can be seen that an alternative embodiment of a pipe is designated generally by the numeral 60. The pipe 60 is formed by a plurality of interlocking forms 62 each of which provides a pipe inner surface 64 and a pipe outer surface 66. The pipe 60 provides a construction similar to that of pipe 10; however, use of the forms 62 precludes the need for an inner and outer sleeve. As best seen in FIGS. 4 and 5, the interlocking form 62 provides an arcuate inner wall 68 and an arcuate outer wall 70. Opposed edges 72 extend inwardly from the inner wall 68 and the outer wall 70 toward one another and are connected by convex nesting members 74. The convex nesting members 74 are alternatingly disposed on each edge of the form 62 so as to form openings 76 therebetween. Therefore, it will be appreciated that when the respective edges of adjacent interlocking forms 62 are mated with one another, the convex nesting member 74 is received within a mating opening 76 of the adjacent form 62. Further, the edges 72 bear against an edge 72 of the adjacent interlocking form 62 to form a seal. If desired, joint compound may be disposed along the edges 72 to further enhance the seal between interlocking forms 62. Of course, other means for sealing the interlocking forms 62 may be employed, such as welding, fusing or the like. As best seen in FIG. 3, when the interlocking forms 62 are assembled to one another, the arcuate shape of the interlocking form 62 forms the pipe 60. Moreover, the nesting convex members 74 form a semi-open conduit 78 which may receive pilot spacers 84 as seen in FIG. 6. Alternating between the conduits 78 are cavities 86.

The pilot spacer 84 includes a tubular member 88 which frictionally receives a reinforcing rod or rebar 89 therethrough. Extending outwardly from the tubular member 88 are semi-circular flanges 90 which are radially disposed in 90° intervals. It will be appreciated that the outer diameter of the flanges is less than the inner diameter of the conduits 78 so as to allow the pilot spacers 84 and associated rebar 89 to be received therein. The pilot spacers 84 function to provide reinforcement and tensile strength to the pipe 60 when concrete is received between the inner surface 64 and the outer surface 66. If desired, a retaining band 92 may be employed to hold the interlocking forms in a pipe configuration until concrete 99 is received therein and sets.

Figure 7:
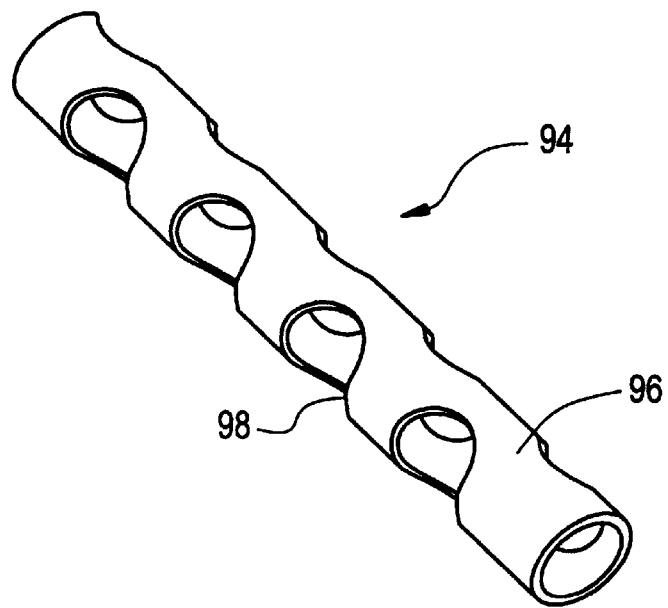
FIG. 7 is a perspective view of a tubular member that may be received within the interlocking forms.

Alternatively, an interconnecting rod 94 as shown in FIG. 7 may be used to interconnect the forms 62 to one another. The interconnecting rod 94 includes a tube 96 which has alternating openings 98 on either side thereof. Those skilled in the art will appreciate that the interconnecting rods 94 are sized to fit within the conduits 78 to assist in their interconnection. As in the previous embodiment, concrete 99 may be inserted through larger diameter holes 24 to assist with the distribution of concrete between the inner wall 68 and the outer wall 70. Smaller diameter holes 24 may be used to vent air and check concrete flow.

In assembling the pipe 60, the interlocking forms 62 are placed adjacent one another and a minimal force is applied to insert the convex nesting members 72 into the corresponding receiving openings 76. This is continued until the last interlocking form 62 completes the diameter of the pipe. At this time, either the pilot spacers 84 or the interconnecting rods 94 are inserted into the conduits 78. Next, a retaining band 92 may be provided around the pipe outer surface 66 to hold the interlocking forms in place. Once all the interlocking forms 62 are secured to one another concrete 99 is poured in the appropriate void or opening to solidify the structure. Once the concrete has set, the trench in which the pipe is held may be filled in.

Figure 8:
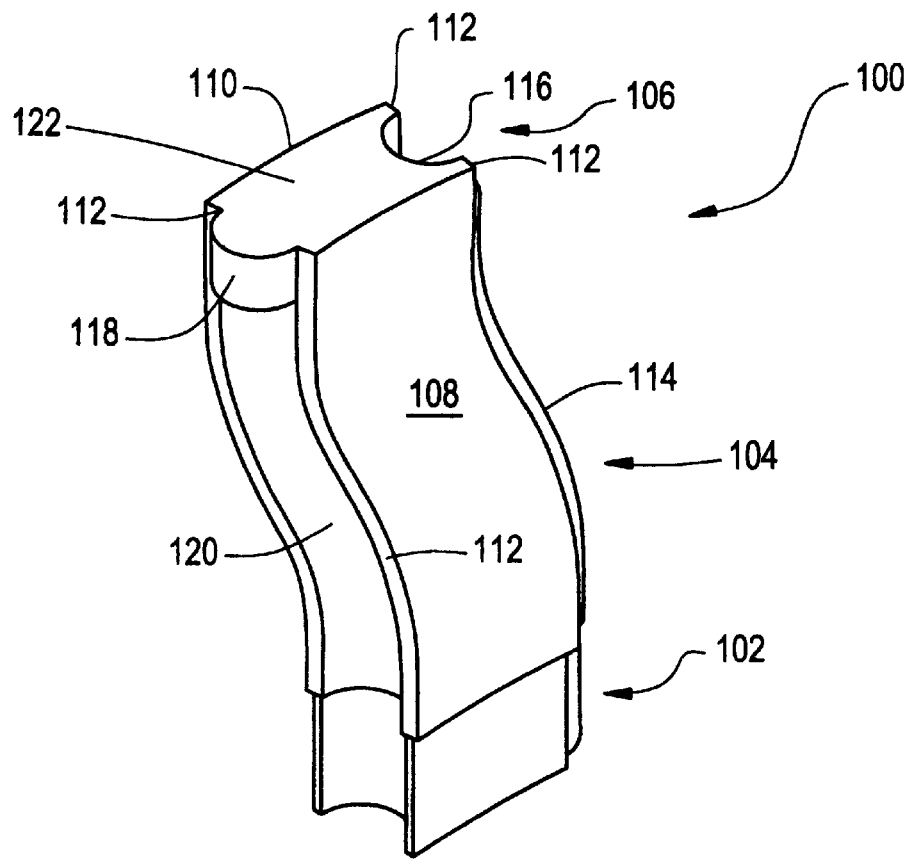
FIG. 8 is a perspective view of an elbow form which is inserted into one end of a concrete pipe to allow for connection to an adjacent concrete pipe of the present invention.

Both pipe embodiments 10 and 60 may be joined by using poured-in-place concrete collars and sealing rings or by banded gaskets, such that the pipe may be free to change length and pivot in the joint. Alternatively, an elbow form 100 as shown in FIG. 8 may be used. A plurality of elbow forms 100 may be disposed around one end of a pipe 60 so that a pipe may be connected to an adjacent pipe. The elbow form 100 includes a pipe section 102 from which extends an angle section 104 and a coupling section 106. The pipe section 102 fits between the pipe inner surface 64 and the pipe outer surface 66 of the pipe 60. The angle section 104 provides a transition from the pipe section 102 to the coupling section 106 which fits over the end of an adjacent pipe. Those skilled in the art will appreciate that the inner diameter of the coupling section 106 is greater than the outer diameter of the adjacent pipe. When fitted together, a joint sealing compound may be used to interconnect one end of a pipe to an end of a pipe which employs the elbow forms 100.

Figure 9:
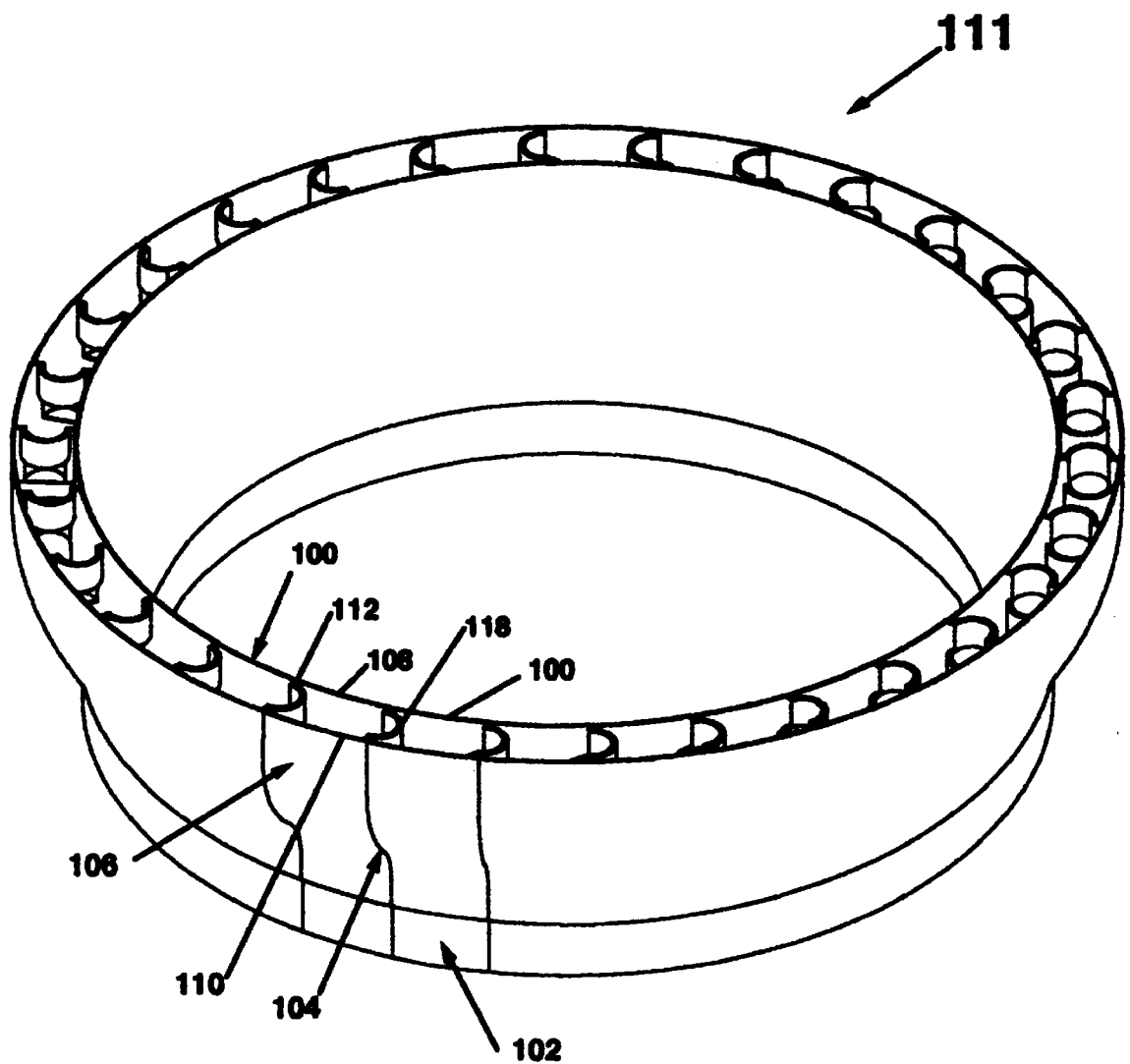
FIG. 9 is a top perspective view of a bell-mouth coupling formed by a plurality of elbow forms.

Each elbow form 100 provides an inner wall 108 and an outer wall 110. Both walls 108 and 110 are arcuately shaped so that when the forms 100 are joined side-by-side, a bell-mouth coupling 111, as best seen in FIG. 9 is formed to interconnect pipes. Extending inwardly from each wall are edges 112. Between the edges 112 on one side of the form 100 is a convex nesting member 114 along the length of the pipe section 102 and the angle section 104, and a concave nesting member 116 along the length of the coupling section 104. Between the edges 112 of the other side of the form 100 is a convex nesting member 118 along the length of the coupling section 106 and a convex nesting member 120 along the length of the pipe section 102 and the angle section 104. A cap 122 interconnects the tops of inner wall 108, outer wall 110, edges 112, concave nesting member 116 and convex nesting member 120. As seen in FIG. 8, the dimensions of the pipe section 102 are reduced to fit into the end of the pipe. When placed side-by-side, the concave member 114 fits into an adjacent convex member 120 and the convex member 116 receives the adjacent concave member 118. Rebar or other reinforcing members may be placed in the cavity formed by the nesting concave and convex members to facilitate interconnecting thereof. Concrete is received in the cavities and between the inner and outer walls to solidify the elbow form. Vents may be provided in outer wall 110 if needed.

These embodiments provide several advantages over existing concrete pipe and methods for assembling the same. First, the polymeric interlocking forms are easily shipped to a site without the need for heavy duty tractor trailers to deposit the pipe or for cranes to lift the pipe off the trailer and into the trench. The present embodiments provide longer lengths of pipe and eliminate the possibility of pipe breakage during shipment. Longer lengths also provide a better seal since there are less connections between pipes to be made. By virtue of there being less connections and by providing a more complete seal between the pipes, less silt, debris or other matter enters the completed pipe. This enhances the flow characteristics of the fluid flowing through the pipe. Additionally, by using a polymeric or plastic inner sleeve or surface, the coefficient of friction between the water and the surface is greatly reduced over pipe constructions which have a concrete inner surface. Finally, these embodiments present a total reduced cost over known methods of laying and constructing pipe network systems. This is by virtue of their being less interconnecting joints, a reduction in the amount of rock/sand needed for preparing the bed upon which the pipe rests, less time spent joining pipes together and the elimination of a crane to lift the pipe into the trench.

Thus it can be seen that the objects of the invention have been attained by the structure and methods of assembly presented above. While in accordance with the patent statutes, only the best mode and preferred embodiment of the invention has been presented and described in detail, the invention is not limited thereto or thereby. Accordingly, for an appreciation of the true scope and breadth of the invention, reference should be made to the following claims.

What is claimed is:

1. A pipe, comprising:

opposed inner and outer sleeves;

at least one spacer ring circumferentially disposed and enclosed between said inner and outer sleeves, wherein said inner sleeve is received within said spacer ring and wherein said outer sleeve is positioned around said spacer ring and said opposed sleeves forming cavities therebetween; and said cavities receiving concrete therein to permanently connect said opposed inner and outer sleeves and said at least one spacer ring to one another to form a pipe.

2. The concrete pipe according to claim 1, further comprising a plurality of elbow forms having a pipe section and a coupling section, each said pipe section connected to an end of the pipe, wherein said coupling section receives an end of an adjacent pipe.

3. The pipe according to claim 1, wherein said spacer ring comprises a plurality of forms interconnected at their respective edges.

4. The pipe according to claim 3, wherein each one of said plurality of forms comprises:

an inner wall;

an outer wall;

at least one rib interconnecting said inner wall and said outer wall; and a first nesting member extending from an edge of at least one of said inner and outer walls that nests with a second nesting member that extends from an edge of at least one of said inner and outer walls, wherein said inner wall is adjacent said inner sleeve and said outer wall is adjacent said outer sleeve.

5. The pipe according to claim 4, wherein said first nesting member extends from each of said inner and outer walls to nest with said second nesting member which extends from each of said inner and outer walls, said inner and outer walls forming said cavities for receiving rebar therein.

6. A method for forming a pipe comprising the steps of:

providing at least two spacer rings;

coupling an inner sleeve with said spacer rings;

positioning an outer sleeve around said spacer rings, said inner sleeve and said outer sleeve having a void therebetween; and filling concrete in said void to permanently interconnect said inner sleeve, said outer sleeve and said spacer rings to one another.

7. The method according to claim 6, wherein said step of providing comprises the steps of:

providing a plurality of like interlocking ring forms, each said ring form having an inner wall, an outer wall, at least one rib interconnecting said inner wall to said outer wall, and a nesting member extending from one of said inner and outer walls to receive an adjacent ring form;

interconnecting said plurality of interlocking ring forms to form said spacer ring; and circumferentially disposing and enclosing said spacer rings between said inner sleeve and said outer sleeve.

8. The method according to claim 7, wherein prior to said filling step the method provides a step of inserting at least one reinforcing member between said inner and outer walls of said spacer rings.

9. The method according to claim 8, further comprising the step of inserting between said inner and outer sleeve a plurality of elbow forms which have a coupling section for receiving an end of an adjacent pipe.

10. A method for forming a concrete pipe, comprising the steps of:

providing a plurality of like interlocking forms, each said form having an arcuate inner wall, an arcuate outer wall, and a nesting member interconnecting said arcuate inner wall to said arcuate outer wall, said arcuate inner wall and said arcuate outer wall having a void therebetween;

interconnecting said plurality of interlocking forms to one another by mating said nesting members with one another to form a pipe;

forming a plurality of semi-open conduits with said nesting members; and filling concrete in said void and said plurality of semi-open conduits to form a concrete pipe by permanently connecting said plurality of interlocking forms to one another.

11. The method according to claim 10, wherein said step of interconnecting further includes the step of inserting a pilot spacer with a reinforcing member into said plurality of semi-open conduits.

12. The method according to claim 10, wherein said step of interconnecting further includes the step of inserting a tube with openings therein into said plurality of semi-open conduits.

13. The method according to claim 12, further comprising the step of inserting between said inner and outer walls a plurality of elbow forms which have a coupling section for receiving an end of an adjacent pipe.

14. A pipe comprising:

a plurality of like interlocking forms each having an arcuate inner wall that forms a circumferential inner surface and an arcuate outer wall that forms a circumferential outer surface, said inner and outer walls having a nesting member interconnecting each edge thereof, each said nesting member received in an adjacent interlocking form, said plurality of interlocking forms forming cavities between said arcuate inner wall and said arcuate outer wall, wherein said nesting member comprises a pair of opposed edges extending inwardly from said inner and outer walls, and a plurality of convex members interconnecting said opposed edges, there being an opening between said convex members to receive convex members from adjacent interlocking forms, and wherein said convex members form a semi-open conduit when said interlocking forms are connected;

said cavities and said semi-open conduits receiving concrete therein to permanently interconnect said opposed inner and outer surfaces.

15. The pipe according to claim 14, further comprising:

a pilot spacer carrying rebar disposed in said semi-open conduits.

16. The pipe according to claim 14, further comprising:

an interconnecting rod having a plurality of alternating openings disposed in said semi-open conduits.Z

* * * * *